United States Patent [19]
Ciani et al.

[11] 3,783,524
[45] Jan. 8, 1974

[54] UNDERWATER ANGLE MEASURING DEVICE

[75] Inventors: John B. Ciani, Port Hueneme, Calif.; Richard G. Luthy, Davisville, R.I.

[73] Assignee: The United States of America as represented by the Secretary of the Navy, Washington, D.C.

[22] Filed: Dec. 7, 1971

[21] Appl. No.: 205,617

[52] U.S. Cl. .................................. 33/285, 33/290
[51] Int. Cl. ............................ G01c 1/00, G01c 1/02
[58] Field of Search ................. 33/285, 281, 276, 33/277, 1 N, DIG. 11, 284, 274, 275, 290, 292

[56] References Cited
UNITED STATES PATENTS

| | | | |
|---|---|---|---|
| 510,339 | 12/1893 | Henderson | 33/281 |
| 521,306 | 6/1894 | Campbell | 33/290 |
| 1,759,482 | 5/1930 | Gendron | 33/285 |
| 1,936,846 | 11/1933 | Leupold | 33/281 |
| 2,482,749 | 9/1949 | Eckert | 33/282 |
| 2,585,751 | 2/1952 | Donnelly | 33/285 |

FOREIGN PATENTS OR APPLICATIONS 247,161 4/1911 Germany ............................ 33/285

OTHER PUBLICATIONS

Iron Age, 9-22-1887, p. 20.

*Primary Examiner*—Robert B. Hull
*Assistant Examiner*—Richard R. Stearns
*Attorney*—Richard S. Sciascia, J. M. St. Amand and David O'Reilly

[57] ABSTRACT

An underwater angle measuring instrument comprising a plane table tripod with a leveling head attached thereto and an angle reading device positioned on the head. The latter includes an outer bearing circle, a vernier circle and adjustment means. By sighting at one specific point and then at a second point, the difference in bearings is the angle of interest.

4 Claims, 6 Drawing Figures

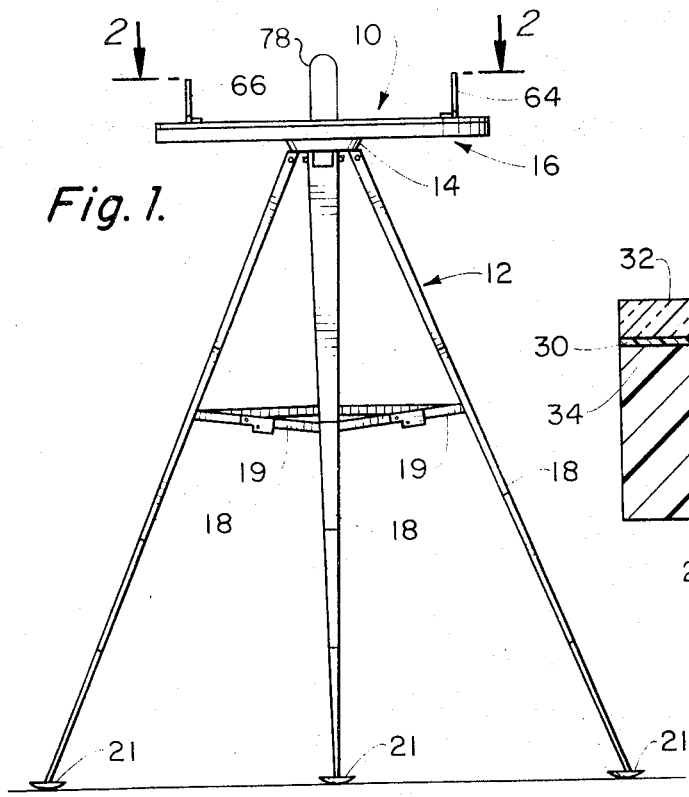
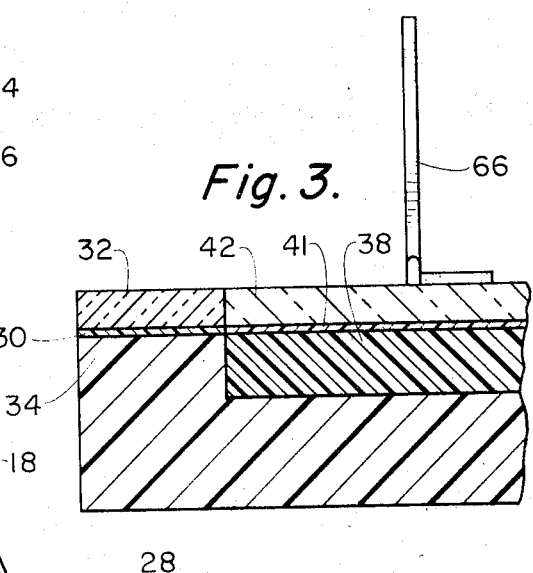
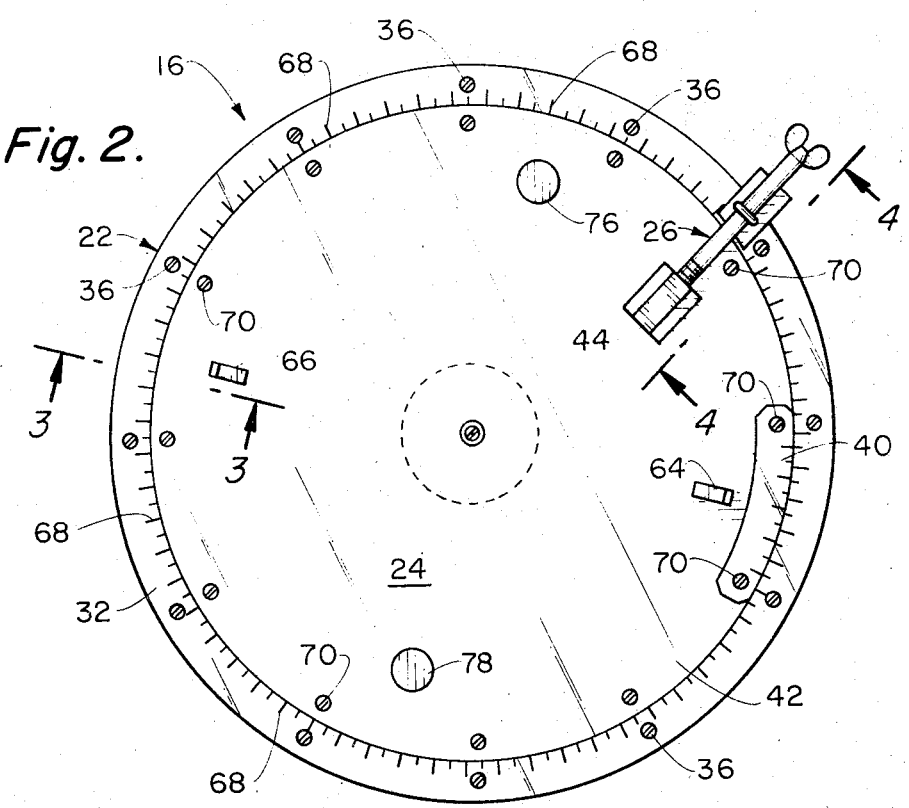

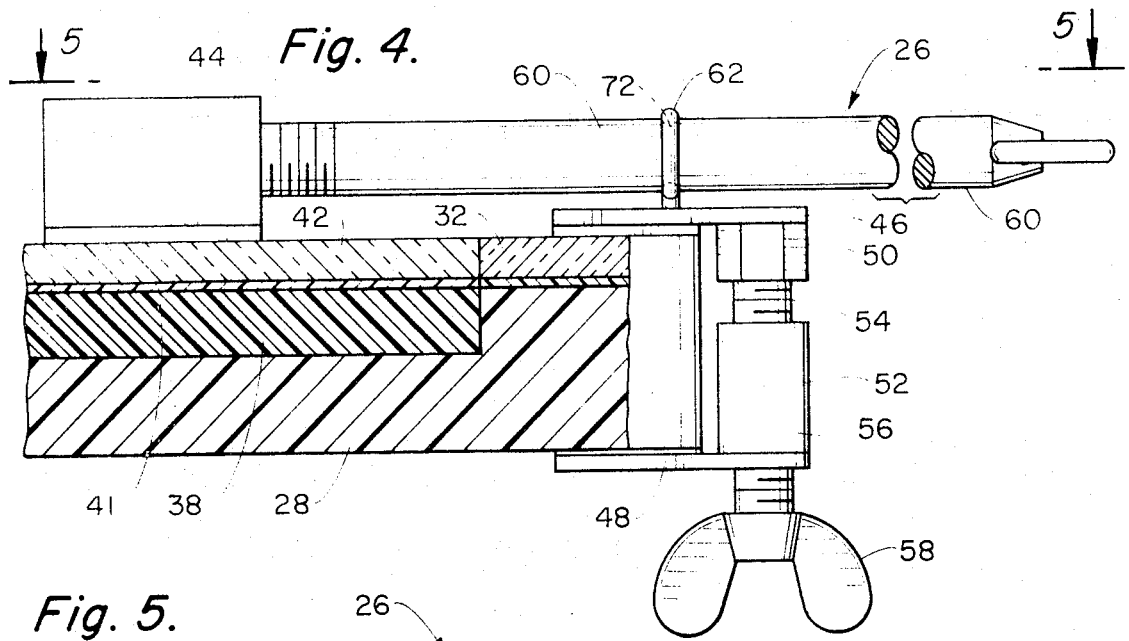
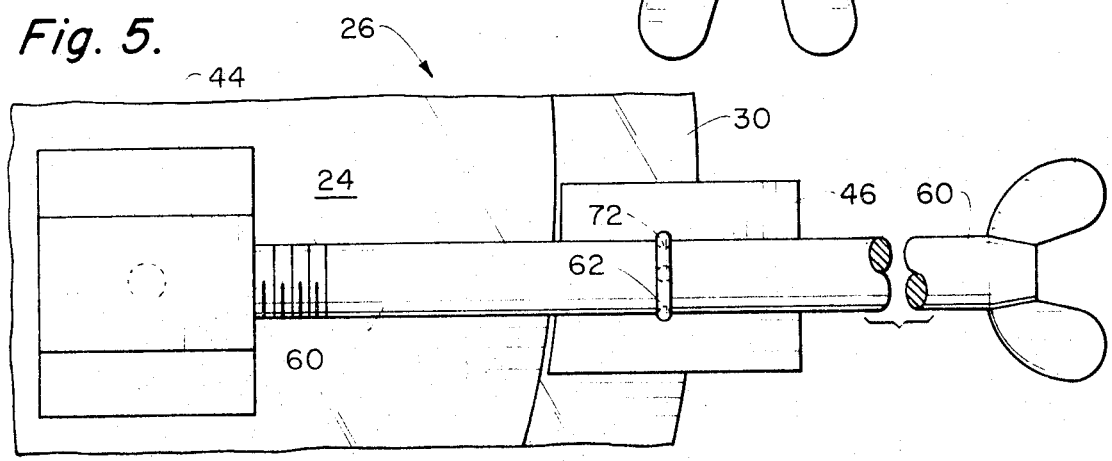
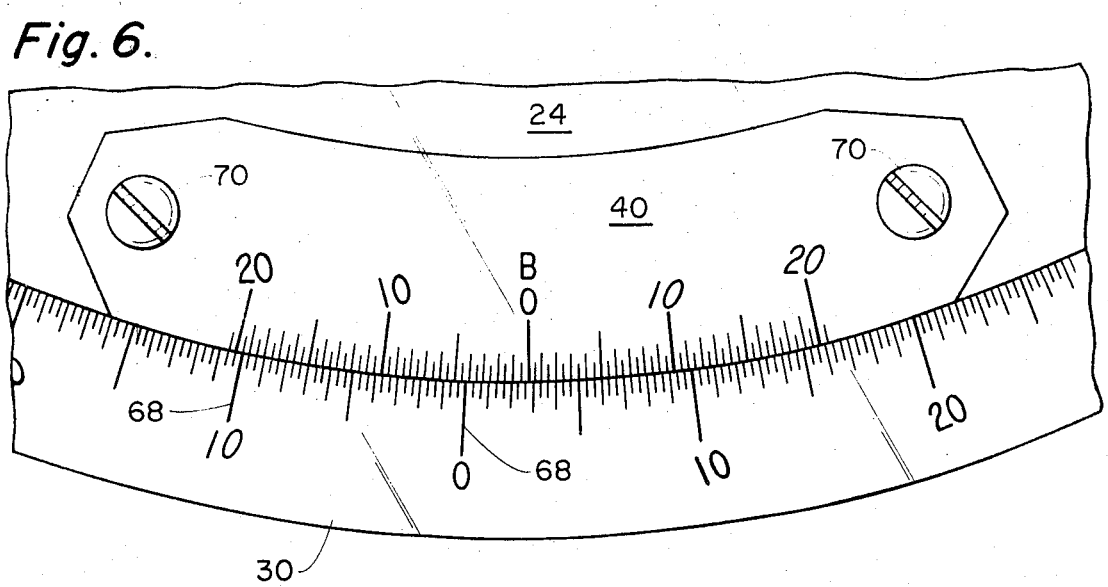

UNDERWATER ANGLE MEASURING DEVICE

BACKGROUND OF THE INVENTION

The present invention relates to bearing and angle measuring instruments and more particularly to such instruments which may be employed underwater.

DESCRIPTION OF THE PRIOR ART

Devices are available for making bearing measurements (angles relative to true north) underwater which might apply indirectly to angle measurements. By far the most prevalent form of navigation tool for underwater swimmers is the bearing measurement device, the most familiar of which is the magnetic wrist compass. Typically, these are marked in 15-degree increments, but some better compasses are larger and are graduated in 5-degree increments and have no provisions for compensation. The accuracy of such a compass is on the order of ±5 degrees with a 95 percent confidence level. These tests refer to course swimming ability; however, if the compass is used to measure the bearing of a visually resolvable line such as a cable or two bottom stakes, the accuracy approaches the resolution and accuracy of the compass itself. The more sophisticated compasses along with appropriate correction cards cannot be expected to perform better than ±1 degree accuracy. By measuring two bearings, an interior angle can be calculated but, if each bearing measurement is ±1 degree, the angle measurement is only accurate to ±1 ½ degrees.

Horizontal protractors are employed by archaeologists to measure angles for the layout of the sites of "finds." These employ a rope which is stretched over the circle from its center. Angles can be read to the nearest 1 degree using these devices, which is adequate accuracy for archaeological work. When underwater visibility is clear, sightings are made by eye.

Some other devices available to swimmers are designed as homing devices. Virtually all these systems depend on acoustics as a sensing media and thus are equipped with fairly broad beam widths for ease of target acquisition. For example, a hand-held sonar is capable of detecting objects up to ranges of 120 yards. A magnetic compass mounted on the sonar is used to measure bearing; however, the beamwidth of the system is ±6 degrees and, thus, the resolution limit is 6 degrees. Another example is a pinger receiver which is capable of detecting acoustic markers up to ranges of 2,000 yards. The beam-width of this unit is approximately 15 degrees. A more recent development used for bearing-bearing navigation relative to emplaced acoustic markers is the positioning and locating system being constructed by the Naval Undersea Research and Development Center. This system measures bearing to one of an array of acoustic markers by phase comparison techniques. This technique is ultimately limited to practical accuracies ±1 degree.

A laser system has been developed specifically for diver survey. This laser directed a beam of collimated blue-green light over a 360-degree horizontal (protractor) circle and vernier. The vernier was readable to ±2 minutes but accurate to only ±10 minutes of arc for a single setting.

Angle measurements made routinely on land are accurate to ±0.10 minute. Of all the devices used underwater, only the laser system could promise accuracies better than ±1 degree. The trade-off to obtain this accuracy is the hazard of divers working around an intense source of energy which, if looked at directly, causes severe eye damage.

SUMMARY OF THE INVENTION

The present invention is an underwater measuring device including a tripod having adjustable legs and an attached leveling head with an angle reading device mounted thereon. The latter angle reading device includes an outer bearing circle, an inner vernier circle and an adjustment screw enabling the two circles to be closely adjusted during the sighting operation. In operation the device is set upon the underwater floor and sighted at a specific point. By sighting at a second point the difference in bearings is the angle of interest.

STATEMENT OF THE OBJECTS OF THE INVENTION

Therefore an object of this invention is to provide an improved instrument for use in underwater surveying operations.

Another object is to provide a device which directly measures angles on the seafloor with a high degree of accuracy.

Another object is to provide a simple, reliable and safe device for measuring angles on the seafloor.

Other objects, advantages and novel features of the invention will become apparent from the following detailed description of the invention when considered in conjunction with the accompanying drawings wherein.

BRIEF DESCRIPTION OF THE DRAWINGS

FIG. 1 is a view of the present angle measuring device mounted at the top of a conventional tripod with the legs spread about and sitting on the ocean floor.

FIG. 2 is a top plan view of the angle measuring device shown in FIG. 1.

FIG. 3 is a sectional view along the line 3—3 of FIG. 2, showing both the outer and vernier circles.

FIG. 4 is a greatly enlarged sectional view along the line 4—4 of FIG. 2 showing the clamp in detail.

FIG. 5 is a top plan view of the fine adjustment screw shown in FIG. 4.

FIG. 6 is an enlarged view of the angle bearing circle and the vernier scale and the relationship therebetween.

DESCRIPTION OF THE PREFERRED EMBODIMENT

The present underwater angle measuring device 10 comprises generally a plane table tripod 12, a leveling head 14 and an angle measuring mechanism 16 mounted on the upper surface of tripod 12.

The tiprod legs 18 are expandable by the collapsible brackets 19 and are telescoping so as to be variable in height and serve to hold the head 14 and measuring mechanism 16 at a comfortable height for the diver. The feet 21 enables the tripod 12 to sit on the sea floor without undue penetration by the tripod legs 18. The leveling head 14 allows the plane of the device 10 to be conventionally leveled.

For convenience in description, the angle measuring mechanism 16 has been divided into three elements, an outer circle 22, a vernier circle 24 and a fine adjustment screw 26.

The outer circle 22 includes a round disc shaped base plate 28 manufactured from a lightweight material including a plastic substance and preferably a methyl acrylate plastic (Plexiglass). An angle bearing circle 30 is positioned flat against the raised periphery 34 of the base plate 28 as shown in FIG. 3 and is held thereon by a relatively thin transparent flat ring 32 also fabricated from a lightweight substance preferably a methyl acrylate plastic commonly known as plexiglass. The bearing circle 30 is easily readable and has fine gradations 68. It preferably is an enlarged photographic print of the angle circle on a surveyor's transit. A series of spaced flathead screws 36 hold the flat ring 32 and bearing circle 30 in position against the raised peripheral portion 34 of base plate 28.

The vernier circle 24 includes a rotatable disc plate 38 positioned on the base plate 28 contiguous to the raised peripheral portion 34 substantially as shown in FIG. 3. A transparent film 41 having an enlarged vernier scale 40 is fastened to the periphery of the rotatable disc plate 38 and an upper relatively thin transparent disc plate 42 is mounted above the vernier film and scale 41 and 40 respectively. It is adapted to hold the vernier film and scale in position as shown in the drawing on FIG. 3. The disc plate 38, vernier film 41 and scale 40 as well as upper disc plate 42 are all fastened together so as to form a single rotatable unit by the screws 70. Here as discussed in relation to the base plate 28 and the flat ring 32, the rotatable disc plate 38 and the upper disc plate 42 are both fabricated from a lightweight material which may be methyl acrylate (plexiglass). A sight 64 preferably of the peep type is mounted on the upper disc plate 42 directly behind and adjacent to the center of the vernier scale 40. A cooperating V-shaped sight 66 is mounted in the line of sight on the opposite side of the said disc plate and a pair of handles 76 and 78 are also mounted on the disc plate 42 out of the line of sight. They enable the vernier circle 24 to be moved easily about the bearing circle 30.

The fine adjustment mechanism 26 is a means of precisely adjusting the vernier scale 40 to the bearing circle 30 and includes a female fitting 44 rigidly mounted on the upper disc plate 42. A clamp 46 is loosely fitted on the peripheral edge of the outer circle 22. It is formed of a pair of upper and lower steel plates 46 and 48 positioned on the upper and lower surfaces of the outer circle as shown in FIG. 4, both of which are adapted to extend beyond the peripheral edge of the outer circle 22. A nut 50 is mounted on the under surface of plate 46 and an unthreaded coupling 52 is mounted on the upper surface of plate 48. A bolt 54 is permanently mounted in the nut 50 and extends through the coupling 52 through an aperture 56 in plate 48. The wing nut 58 is threaded onto bolt 54 and is tightened at any degree of the outer bearing circle 30. Finally, an eye bolt 62 pivotally mounted on the upper surface of plate 46 is positioned in a groove 72 located about the periphery of bolt 60 which threads into the female fitting 44 pivotally mounted on disc plate 42. It is emphasized that the foregoing description of the clamp arrangement is only one of many which may be employed in the present invention as a fine adjustment mechanism for adjusting the vernier scale 40 in relation to the angle bearing circle 30.

In operation, a diver sets up the device 10 on the seafloor and then levels it with the leveling head 14. He then sights on a distant range pole placed at a specific point and then tightens the wing nut 58 onto bolt 54. A fine adjustment is made while sighting the range pole very carefully by rotating the bolt 60 which passes through eye bolt 62 and threads into female fitting 44. Since both the eye bolt and female fitting are pivotally mounted, the vernier scale 40 will rotate to define an exact angle bearing to the nearest 30 seconds. This operation is repeated at another point and the difference in bearings is the angle of interest.

Obviously, many modifications and variations of the present invention are possible in the light of the above teaching. It is therefore to be understood that within the scope of the appended claims the invention may be practiced otherwise than as specifically described.

We claim:

1. An underwater angle measuring device comprising:
   an adjustable tripod;
   a leveling head positioned at the top of said tripod;
   a circular-shaped base plate attached to said leveling head fabricated of a methyl acrylate plastic; said baseplate having a raised flat surface around its periphery;
   a film in the form of a ring having angle bearing graduations thereon positioned on and coinciding with the raised flat surface of the base plate;
   a transparent flat ring fabricated of a methyl acrylate plastic positioned over the angle bearing film ring and fastened to the raised flat surface of the base plate;
   a lower disc plate rotatably mounted on the base plate inside of and contiguous with the raised flat surface;
   a circular film having a vernier scale thereon positioned on and coinciding with the rotatable disc plate whereby the vernier scale is adjacent to the angle bearing graduations;
   a transparent upper disc plate positioned over the circular film having said vernier scale, said upper disc plate being fastened to and coinciding with said lower disc plate mounted on the base plate; and
   means for sighting on a point mounted on the upper disc plate; said sighting means comprising a peep sight mounted adjacent to the center of the vernier scale and a v-shaped sight mounted diametrically opposite to the peep sight.

2. An underwater angle measuring device as recited in claim 1 including means for making coarse adjustments of the vernier scale with respect to the angle bearing graduations; said course adjusting means comprising two elongated handles attached perpendicularly to opposite sides of the upper disc plate out of the line of sight of said sighting means for rotating the vernier scale with respect to the angle bearing graduations.

3. An underwater angle measuring device as recited in claim 2 including means for making fine adjustments of the vernier scale with respect to the angle bearing graduations; said fine adjusting means being clamped to the periphery of the base plate and flat ring and adapted to rotate said vernier scale in small increments.

4. An underwater angle measuring device as recited in claim 3 wherein the fine adjustment means comprises:
   a threaded female fitting pivotally mounted on the upper disc plate;
   an adjustable clamp arrangement comprised of upper and lower plates extending over the peripheral edge of the base plate and flat ring and a wing nut adapted to tighten the clamp;

a pivotally mounted eye bolt attached to the upper plate of the clamp; and a bolt secured in said eye bolt and threaded in said pivotally mounted female fitting so that rotation of said bolt permits small incremental adjustments of the vernier scale with respect to the angle bearing graduations.

* * * * *